United States Patent [19]

Turner et al.

[11] Patent Number: 5,106,884

[45] Date of Patent: Apr. 21, 1992

[54] FLEXIBLE POLYUREA FOAMS HAVING CONTROLLED LOAD BEARING QUALITIES

[75] Inventors: Robert B. Turner; Ralph D. Priester, Jr.; Robert A. Kuklies; Richard D. Peffley, all of Lake Jackson; Ronald M. Herrington, Brazoria; James R. Porter, Lake Jackson, all of Tex.

[73] Assignee: The Dow Chemical Company, Midland, Mich.

[21] Appl. No.: 264,126

[22] Filed: Oct. 28, 1988

[51] Int. Cl.$^5$ .......................... C08J 9/12; C08K 3/16; C09K 3/00

[52] U.S. Cl. .............................. 521/123; 252/183.13; 252/350

[58] Field of Search ............... 428/308.4; 521/63, 159, 521/137, 167, 123

[56] References Cited

U.S. PATENT DOCUMENTS

| | | | |
|---|---|---|---|
| 3,068,188 | 12/1962 | Beste et al. | 524/104 |
| 3,526,531 | 9/1970 | Asano et al. | 427/246 |
| 3,531,512 | 9/1970 | Hardt et al. | 560/25 |
| 3,573,247 | 3/1971 | Minobe et al. | 524/315 |
| 3,574,148 | 4/1971 | Windemuth et al. | 521/119 |
| 3,645,976 | 2/1972 | Suzuki et al. | 528/48 |
| 3,743,620 | 7/1973 | Frye | 521/61 |
| 3,753,933 | 8/1973 | Olstowski et al. | 521/170 |
| 3,773,695 | 11/1973 | Argabright et al. | 521/167 X |
| 3,838,076 | 9/1974 | Moss et al. | 521/164 |
| 3,871,911 | 3/1975 | Conacher, Jr. | 428/423.3 |
| 3,876,604 | 4/1975 | Caruso et al. | 524/769 |
| 3,888,831 | 6/1975 | Kogon | 528/48 |
| 3,891,606 | 6/1975 | Kogon | 528/65 |
| 3,899,438 | 8/1975 | Kalil | 252/182.15 |
| 3,900,447 | 8/1975 | van Gulick | 525/440 |
| 3,917,792 | 11/1975 | Conacher, Jr. | 264/328 C |
| 4,029,730 | 6/1977 | Schroeder | 264/315 |
| 4,052,613 | 10/1977 | Murphy et al. | 250/259 |
| 4,071,279 | 1/1978 | Chung | 301/63 PW |
| 4,071,492 | 1/1978 | Bethea et al. | 524/775 |
| 4,073,858 | 2/1978 | Chung | 264/262 |
| 4,075,150 | 2/1978 | Hoeschele | 524/871 |
| 4,080,345 | 3/1978 | Riemhofer | 521/119 |
| 4,095,637 | 6/1978 | Krishnan | 152/323 |
| 4,282,344 | 8/1981 | Caruso | 528/51 |
| 4,330,454 | 5/1982 | Kimball | 524/773 |
| 4,357,401 | 11/1982 | Andre et al. | 429/192 |
| 4,391,742 | 7/1983 | Steigerwald et al. | 252/512 |
| 4,436,841 | 3/1984 | Rasshofer et al. | 521/106 |
| 4,438,223 | 3/1984 | Hunter | 252/350 X |
| 4,546,116 | 10/1985 | Muller et al. | 521/106 |
| 4,575,518 | 3/1986 | Rasshofer et al. | 521/51 |
| 4,618,630 | 10/1986 | Knobel et al. | 521/123 X |
| 4,686,240 | 8/1987 | Bailey et al. | 521/103 |
| 4,714,574 | 12/1987 | Tenhagen | 264/45.1 |
| 4,743,624 | 5/1988 | Blount | 521/106 |
| 4,845,133 | 7/1989 | Priester, Jr. et al. | 521/167 |
| 4,980,388 | 12/1990 | Herrington et al. | 521/130 |

FOREIGN PATENT DOCUMENTS

| | | | |
|---|---|---|---|
| 1086915 | 10/1980 | Canada | 521/63 |
| 2003452 | 11/1969 | France . | |
| 1037810 | 2/1986 | Japan | 521/167 |
| 1484017 | 11/1973 | United Kingdom . | |

OTHER PUBLICATIONS

*Hawley's Condensed Chemical Dictionary*, 11th Edition, Revised by N. I. Sax et al., Van Nostrand Reinhold, New York, (1987), p. 433.

*The American Heritage Dictionary*, 2nd College Edition, Houghton Mifflin Co., Boston, Mass., (1985), p. 215.

"The Industrial Production . . . ", by M. J. Brown, pp. 538–543, Polyurethanes World Congress 1987—Sep. 29–Oct. 2, 1987.

"Anlage fur Weichschaumsitze . . . ", by A. Bauer, W. Dausch and A. Daniel, pp. 544–552, Polyurethanes World Congress 1987—Sep. 29–Oct. 2, 1987.

"Effect of Certain Additives on the Properties of Polyurethane Foam", by G. A. Razuvaev et al., pp. 11–12, (1981).

Derwent 35771K/15, Chemical Abstract 85:33857t, Chemical Abstract 78:73140r, and Derwent 86-129274/20.

Chemical Abstracts 104:51350a, 102:186443z, 95:133759n.

*Primary Examiner*—Richard D. Lovering

[57] ABSTRACT

The invention includes a process for preparing a flexible, water-blown polyurea foam by reacting a reaction mixture containing at least one polyisocyanate component and an active hydrogen component, wherein active hydrogen compounds of relatively high equivalent weight have an average of about 1.5 to about 4 active hydrogen-containing groups per molecule, of which active hydrogen-containing groups: an average of (a) from about 5 to about 60 percent are primary aliphatic amine groups or (b) at least about 25 percent are primary aromatic, secondary aliphatic, Lewis acid-blocked primary or secondary aliphatic or aromatic amine groups or mixtures of such groups. An amount of at least one alkali metal halide salt effective to increase load bearing strength of the foam is incorporated into the reaction mixture. Differing amounts of alkali metal halide salts are suitably incorporated into different areas of the foam to produce areas having differing load bearing strengths. The invention includes the foams formed by the processes of the invention as well as active hydrogen compositions containing the alkali metal halide salts and useful in the processes.

29 Claims, No Drawings

FLEXIBLE POLYUREA FOAMS HAVING CONTROLLED LOAD BEARING QUALITIES

BACKGROUND OF THE INVENTION

This invention relates to flexible polyurea foams. More specifically, it concerns controlling the load bearing properties of such flexible foams.

Flexible polyurea foams are used in a wide variety of applications, particularly as cushioning such as in automobile seats, headrests, dashboards and the like, in furniture, bedding, carpet padding, packaging, toys and the like. The ability to control load bearing properties of such foams is important because each application presents its own requirements of support and/or perceived softness. For instance, an automobile seat should support a person sufficiently to cushion him from road bumps, and should also be comfortable.

Foam-forming formulations are carefully chosen to produce predetermined load bearing properties. Load bearing is, for instance, generally increased by adding fillers, using copolymer polyols, using chain extenders, increasing crosslinking, increasing density or increasing the isocyanate index. These methods of increasing load bearing strength, however, often increase the cost of a foam by requiring use of additional materials. Physical properties or handling properties are also often affected. For instance, viscosity of a foam-forming formulation may often be increased by addition of fillers, copolymer polyols and the like.

Polyurea foams are generally advantageous when relatively high load bearing strengths are needed. The advantages of polyurea formulations over polyurethane formulations that produce similar load bearing characteristics frequently include lower isocyanate index, lower viscosity because copolymer polyols are often unnecessary, and less foam shrinkage since less crosslinker is generally required.

Furthermore, certain foam applications, such as comfort cushioning, frequently require that the foam used have different load bearing strengths in different parts of the foam. For instance, seating may be more comfortable when one sits directly on a relatively less load bearing (generally perceived as softer) section of a seat, but that section is surrounded by relatively harder cushioning. Foam having different load bearing strengths in different areas of the foam is often referred to as dual hardness foam, although more than two regions having different hardness may be present. Such foams may be formed by various methods including pouring foams of differing compositions into a common mold as described, for instance, by M. J. Brown in "The Industrial Production of Dual Hardness Foam Seats Using Polymer Polyols, Robots and Unmodified Moulds," in *Polyurethanes World Congress* 1987, pp. 538–543 (1987) and U.S. Pat. No. 4,714,574, which is incorporated herein by reference. The use of differing compositions, however, is often accompanied by physical separation of parts of a foam having different compositions.

It is desirable to overcome or ameliorate difficulties such as separation caused by differences in curing dual hardness foams. Furthermore, it is desirable to increase the load bearing strength of polyurea foam, especially to do so with less shrinkage, formulation viscosity or concentration of isocyanate than is frequently required when increased load bearing is desired.

SUMMARY OF THE INVENTION

In one aspect, the invention is an improvement in a process for preparing a flexible, water-blown polyurea foam by reacting a reaction mixture containing at least one polyisocyanate component and an active hydrogen component, wherein active hydrogen compounds of relatively high equivalent weight have an average of about 1.5 to about 4 active hydrogen-containing groups per molecule, of which active hydrogen-containing groups an average of (a) from about 5 to about 60 percent are primary aliphatic amine groups or (b) at least about 25 percent are primary aromatic, secondary aliphatic, Lewis acid-blocked primary or secondary aliphatic or aromatic amine groups, or mixtures of such groups, the improvement comprising incorporating into the reaction mixture an amount of at least one alkali metal halide salt effective to measurably increase load bearing strength of the foam over that of a foam having the same components but without the alkali metal halide salt.

In another aspect, the invention is a flexible, water-blown polyurea foam formed by the process of the invention.

In another aspect, the invention is a method of preparing a flexible, water-blown polyurea foam by reacting a reaction mixture under conditions such that a flexible polyurea or polyurea-polyurethane foam is obtained, wherein the reaction mixture comprises at least one polyisocyanate component and an active hydrogen component, wherein active hydrogen compounds of relatively high equivalent weight have an average of about 1.5 to about 4 active hydrogen-containing groups per molecule, of which active hydrogen-containing groups: an average of (a) from about 5 to about 60 percent are primary aliphatic amine groups or (b) at least about 25 percent are primary aromatic, secondary aliphatic, Lewis acid-blocked primary or secondary aliphatic or aromatic amine groups or mixtures of such groups, said foam having areas of differing load bearing strength by incorporating therein differing concentrations of at least one alkali metal halide salt in each of the areas.

In another aspect, the invention is a flexible, water-blown polyurea foam formed by the process of the invention, said foam having multiple areas of differing load bearing strength corresponding to areas having differing relative proportions of at least one alkali metal halide salt.

In yet another aspect, the invention is an active hydrogen composition comprising (a) at least one active hydrogen compound wherein active hydrogen compounds of relatively high equivalent weight have an average of from about 1.5 to about 4 active hydrogen-containing groups per molecule, of which active hydrogen-containing groups: an average of (1) from about 5 to about 60 percent are primary aliphatic amine groups or (2) at least about 25 percent are primary aromatic, secondary aliphatic Lewis acid-blocked primary or secondary aliphatic or aromatic amine groups or mixtures of such groups; (b) from about 2 to about 12 parts by weight of water per 100 parts by weight component (a): and (c) an alkali metal halide salt in an amount sufficient to increase the load bearing strength of a foam made by reacting the active hydrogen composition with a polyisocyanate over the load bearing strength of a foam having the same components but without the alkali metal halide salt.

It has been found that the use of alkali metal halide salts, as defined herein, provides a convenient method for control of the load bearing strength of flexible polyurea foams. Use of varying concentrations of the alkali metal halide salts in different portions of a foam advantageously produces a foam having areas or regions of varying load bearing strength.

DETAILED DESCRIPTION OF THE INVENTION

This invention involves controlling the load bearing strength of polyurea foams. The term polyurea foams is used to designate those foams formed from a polyisocyanate component and an active hydrogen component wherein active hydrogen compounds of relatively high equivalent weight have an average of about 1.5 to about 4, preferably from about 1 8 to about 3, active hydrogen-containing groups per molecule, of which active hydrogen-containing groups, (a) from about 5 to about 60 percent are primary aliphatic amine groups or (b) at least about 25 percent are primary aromatic secondary aliphatic, Lewis acid-blocked primary or secondary aliphatic or aromatic amine groups or mixtures of such groups. The relatively high equivalent weight compounds having such amine groups are referred to herein as an "amine-terminated compounds." Amine terminated compounds are preferably polyethers having terminal amine and, optionally, hydroxy groups. The equivalent weight of the amine-terminated compound depends somewhat on the particular type of foam being prepared, but is advantageously from about 400 to about 5000 and, preferably, from about 500 to about 2500, wherein the equivalent weight is the molecular weight divided by the number of hydroxyl and amine groups, whether the amine groups be primary or secondary amine groups. Preparation of polyurea foams from amine-terminated compounds is taught in U.S. Pat. No. 4,845,133 and U.S. Pat. No. 3,838,076 which are incorporated herein by reference in their entireties. It is recognized that polyurea foams optionally have groups such as urethane groups as well as urea groups.

The amine-terminated compound is, optionally, mixed with other active hydrogen components. Active hydrogen components are compounds having hydrogen-containing functional groups which react with an isocyanate group. The Zerewitinoff test described by Kohler in the *Journal of the American Chemical Society*, Vol. 49, page 3181 (1927) predicts the tendency of a hydrogen-containing group to react with isocyanates. Suitable active hydrogen components are described in U.S. Pat. No. 4,845,133 and specifically include, in addition to amine-terminated compounds: polyols, chain extenders and crosslinkers Polyols are relatively high equivalent weight (e.g. greater than about 400 equivalent weight) components nominally having an average of at least two hydroxyl groups per molecule. Polyols are preferably polyether polyols or polyester polyols, most preferably polyether polyols.

Crosslinkers include alkanolamines and other compounds of about 400 or lower equivalent weight having about 3-8, preferably about 3-4 active hydrogen-containing groups per molecule. Chain extenders are compounds having two active hydrogen-containing groups per molecule and an equivalent weight from about 31 to about 400. Chain extenders and crosslinkers having at least one amine functional group are preferred for use in the practice of the invention. A crosslinker and/or chain extender is, preferably, present in an amount less than about 5 parts by weight per 100 parts of relatively high molecular weight compounds, including polyols and amine-terminated compounds.

The active hydrogen component is admixed with a polyisocyanate component and allowed to react to form a polyurea. Polyisocyanate components suitable for use in the practice of the invention are organic compounds that contain at least two isocyanate groups. Suitable polyisocyanate components, too, are described in U.S. Pat. No. 4,845,133. Toluene diisocyanate (TDI), methylene diphenyldiisocyanate (MDI) and polymeric methylene diphenyldiisocyanates (PMDI) are exemplary of preferred polyisocyanates.

An alkali metal halide salt effective to increase load bearing properties of a foam is used in the practice of the invention. Suitable alkali metal halide salts include the fluorides, chlorides, bromides or iodides of Metals of Group IA of the Mendeleef periodic table. Preferably, the cations are cesium, sodium, potassium or lithium, more preferably, lithium or potassium. Preferably, the anions are chlorides or iodides, most preferably iodides. Suitable salts include lithium chloride, lithium bromide, lithium iodide, lithium fluoride, potassium iodide, sodium chloride, cesium chloride, potassium bromide, sodium iodide, cesium iodide, potassium chloride, potassium fluoride, cesium fluoride, cesium iodide, sodium bromide, cesium bromide, and the like and mixtures thereof. Preferably, the salts are soluble in a component of the polyurea forming composition or in a diluent which is suitable for including in, but not reacting with components of, a polyurea formation without significantly undesirably changing the physical properties of a foam produced therefrom. The salts are more preferably soluble in a chain extender, a crosslinker, a diluent, an amine-terminated compound or mixtures thereof; most preferably in a chain extender, crosslinker, diluent or mixture thereof. Potassium iodide and lithium chloride are the more preferred salts, with potassium iodide as the most preferred salt.

Alkali metal halide salts are used in the invention in amounts effective to modify load bearing strength of a polyurea foam Load bearing strength is advantageously measured according to the procedures of ASTM D 3574-86. Modification in load bearing strength is determined by comparing the load bearing strength of a foam prepared from a given formulation not containing an alkali metal halide salt and a foam prepared from the same formulation, but having a alkali metal halide salt therein according to the invention. The magnitude of the effect on load bearing strength of a foam observed on addition of a specified amount of alkali metal halide salt to a polyurea forming composition depends on the components of that composition and the process used to prepare the foam. Sufficient alkali metal halide salt is preferably used to produce an increase in indentation force deflection (IFD) of at least about 5, more preferably at least about 10, most preferably at least about 25%. Most preferably, a foam having an 65% IFD of from about 50 to about 150 pounds/50 square inches or Newtons/323 square centimeters is prepared Load bearing is measured as IFD, indentation load deflection (ILD) or compressive load deflection (CLD), generally depending on the size of samples available. Results of measurement of ILD and CLD parallel measurements of IFD in relative magnitude among a series of samples, but the measurements may differ somewhat in actual quantitative magnitude.

The salts are generally effective to modify the load bearing strength of a foam in an amount of at least about 0.001 millimoles alkali metal halide salt per 100 grams by weight of relatively high equivalent weight active hydrogen component(s) in a polyurea-forming composition. The upper limit of alkali metal halide salt used varies with the alkali metal halide salt, the components and process used to make a foam, and is generally that amount of alkali metal halide salt which unacceptably changes the processability or a property of the foam. Too much halide salt can affect processability, for instance, by reducing the activity of some catalysts. Effects on physical properties may be noted, for instance, in foam collapse, internal ruptures or fissures, internal degradation or marked shrinkage (greater than about 10% by volume in the case of a free rise foam, greater than can be rectified by crushing in the case of a molded foam). Use of cell openers often extends the useful range of concentrations of alkali metal halide salts, however. Preferably, the alkali metal halide salt is used in an amount of from about 0.001 to about 100, more preferably from about 0.1 to about 50, most preferably from about 1 to about 40 millimoles of alkali metal halide salt per 100 grams of relatively high equivalent weight active hydrogen component(s).

The process of the invention is also useful in combination with other methods of achieving preselected load bearing properties. Use of a combination of methods is particularly useful when a preselected combination of properties is desirable. For instance, it may be impractical to produce a foam of a preselected load bearing strength by adjusting alkali metal halide salt content alone. Those skilled in the art are familiar with methods of controlling load bearing strength and can combine them with the process of the invention without undue experimentation. For instance, load bearing may be increased by adding fillers, using crosslinkers, using copolymer polyols, or increasing the isocyanate index.

Alkali metal halide salts are combined with the reactive components in the practice of the invention by dissolving the alkali metal halide salts in water or other liquids used in a foam-forming formulation. Suitable liquids include water and any other liquid useable in a polyurea foam formulation in which liquid the alkali metal halide salt is soluble. Such liquids include, for instance, chain extenders or crosslinkers as well as diluents which dissolve the salt but do not react with polyurea-forming components. Suitable compounds include, for instance, diethanol amine, 1,4-butane diol, ethylene glycol, ethylene oxide-based polyols and amine-terminated compounds and the like. Preferably the relatively low equivalent weight active hydrogen compound has at least one amine group. While the alkali metal halide salts are suitably dissolved in water, they are preferably dissolved in a relatively low equivalent weight active hydrogen compound (e.g. a chain extender or crosslinker) or diluent, without first being dissolved in or hydrated with water. The mixture is subsequently admixed with other polyurea formulation components. A solution of an alkali metal halide salt is generally conveniently added to other components as a separate stream being admixed with streams of polyisocyanate components and active hydrogen components as they all flow into a place where the foam is to form. Alternatively, the alkali metal halide salt solution is conveniently mixed with the active hydrogen components before mixture thereof with the polyisocyanate component of a polyurea-forming formulation.

Alkali metal halide salts are suitably used according to the practice of the invention to produce foams having multiple areas of differing load bearing strength that is, foams having at least two portions thereof in which measurements of the load bearing strength differ from one another. To produce areas of differing load bearing strength, one varies the relative proportion of alkali metal halide salt in the polyurea foam-forming composition used to produce each area (or portion) of the foam. Variation is conveniently accomplished, for instance, in a multicomponent foam dispensing machine by using a separate stream for a alkali metal halide salt, or solution thereof, and dispensing proportionately more alkali metal halide salt during the dispensing of one portion of the foam-forming composition than is dispensed for the remainder of the foam. The principles of and apparatus for varying the amounts of certain ingredients are known to those skilled in the art and are taught, for instance, by M. J. Brown in "The Industrial Production of Dual Hardness Foam Seats Using Polymer Polyols, Robots and Unmodified Moulds," and by A. Bauer et al. in "Production Lines for Multi-Hardness Flexible Foam Seats," both in *Polyurethanes World Congress* 1987, pp. 538-543 and pp. 544-552, respectively, (1987), the teachings of which are incorporated herein by reference. These principles and apparatus, as well as other commercially available apparatus, are readily used to dispense alkali metal halide salts according to the practice of the invention in varying relative proportions to other foam ingredients within a foam mass. Other ingredients, such as, for instance, a cell opening compound can also be used in varying relative proportions as needed to balance effects of varying alkali metal halide salt concentration. Preferably, the relative proportion of a solution of an alkali metal halide salt is varied with respect to other ingredients as a single foaming mass is poured without a requirement for separate pourings of foam formulations having differing relative proportions of the alkali metal halide salt. The term "relative proportions" is used to refer to the ratio of alkali metal halide salt to other ingredients in a foam-forming formulation. The proportion of alkali metal halide salt is expressed herein in millimoles per 100 grams relatively high equivalent weight active hydrogen compound(s) except where otherwise noted.

The invention is applicable to polyurea foams, both molded and free rise foams. Molded foams are manufactured by reacting polyurethane-forming components in a closed mold to produce foams having a predetermined shape. Free rise foams are manufactured such that foam-forming components rise freely against their own weight, such as on a conveyer belt or in an open mold, for instance. Free rise foams include foams often referred to as slabstock foams.

A blowing agent is advantageously used to generate the gas or vapor for bubbles in foam formation. The term "water-blown" foams is used to designate foams in which water is the primary blowing agent, that is, at least about 50 percent of the moles of gas used in blowing come from water or the reactions thereof. Water reacts with isocyanate groups to form carbon dioxide gas and may also react with other compounds or be vaporized. Other blowing agents or mixtures thereof are suitable for use with water in the practice of the invention. Other suitable blowing agents include blowing agents which are volatile at temperatures reached in the foaming process, blowing agents which react or split to form gases, and dispersed inert gases. Suitable organic blowing agents include acetone: ethyl acetate: methanol; ethanol; halogenated alkanes such as methylene chloride; chloroform: hard chlorofluorocarbons (not having hydrogen atoms) such as monofluorotricholormethane, dichlorodifluoromethane and the like; soft chlorofluorocarbons (having hydrogen atoms) such as chlorodifluoromethane and the like: butane; hexane: heptane; diethyl ether; and the like. Gases inert to the starting components such as nitrogen, air and the like are also useful blowing agents. Compounds such as azides which decompose at temperatures present in the mold to produce gases such as nitrogen are also useful. In the practice of the invention, water is preferably used alone as blowing agent; when mixtures of other (auxiliary) blowing agents with water are used, the preferred auxiliary blowing agents for the purpose of preparing foams having physical properties suitable for most applications are soft chlorofluorocarbons, methylene chloride, other halogenated alkanes and the like. It is, however, preferable, for reasons of complying with the Montreal Protocol, to reduce the use of hard chlorofluorocarbons in foam preparation.

The amount of blowing agent employed should be sufficient to achieve a preselected amount of foaming of the reaction mixture. Said amount will vary with factors such as the preselected density desired in a foamed product. In the practice of the invention, water-blown free rise foams preferably utilize from about 2 to about 12, more preferably from about 2 to about 10, most preferably from about 2 to about 6 parts of water per hundred parts of active hydrogen components Water-blown molded foams preferably utilize from about 2 to about 8, more preferably from about 2 to about 6, most preferably from about 3 to about 5 parts of water per hundred parts of active hydrogen components.

When other blowing agents are used with water, the amount of water is generally reduced in proportion to the amount of auxiliary blowing agents used. The relative proportions of water reduced to other blowing agent(s) used is generally determined by their relative blowing indexes which reflect the moles of blowing agent generated relative to the weight of blowing agent. For instance, one part of water per hundred of active hydrogen components is generally replaced by ten parts of trichlorofluoromethane or with nine parts of methylene chloride. Trichlorofluoromethane has a blowing index of ten, and methylene chloride has a blowing index of nine. Those skilled in the art are familiar with using blowing indexes to determine mixtures of blowing agents suitable for preparing foams having preselected physical properties.

Amounts of blowing agents are generally used to produce foams having a preselected density. When toluene diisocyaante is used in making a free rise foam, the density is generally preselected to be below about 6 pounds per cubic foot (PCF), preferably from about 0.75 to about 5, preferably from about 0.9 to about 2.5 pounds per cubic foot. In foams made with diphenylmethane diisocyanates, however, densities of from about 0.9 to about 3 are preferably selected. In the case of molded foams prepared according to the practice of the invention, a density is preselected preferably in the range of from about 0.75 to about 3 PCF, more preferably from about 1 to 2.5 PCF.

One or more catalysts are beneficially used in making polyureas. Suitable catalysts are described in U.S. Pat. No. 4,845,133 which is incorporated herein by reference. Catalysts known to promote formation of urethane and urea groups rather than trimerization of isocyanates to form isocyanurates are generally preferred for use in the practice of the invention.

Alkali metal halide salts used according to the practice of the invention frequently change the reaction times of a foam-forming mixture using a particular catalyst or combination thereof. Specifically, the cream and demold times may be faster, while the gelling and blowing times may be increased. Those skilled in the art are familiar with adjusting catalyst types and amounts to compensate for such effects without undue experimentation. For instance, the amount of tin catalyst may be reduced or a less reactive polyol may be used.

In the practice of the present invention, the alkali metal halide salts are preferably used in the substantial absence of an organic ester of an acid of hexavalent sulfur. Such sulfur compounds can poison catalysts. Organic esters of acids of hexavalent sulfur include straight chain and cyclic compounds having at least one sulfur atom double bonded to two oxygen atoms and having two single bonds to carbon, sulfur or oxygen atoms such as sulfonates, sultones, sulfates, esters of thiosulfonic acid, esters of thiosulfuric acid and the like.

The term "substantial absence") is used to refer to less than about 1 part by weight of hexavalent sulfur compounds per 100 parts by weight of relatively high equivalent weight active hydrogen components, preferably less than about 0.5 part per 100 parts of relatively high equivalent weight active hydrogen components. Most preferably, there is absence of deliberately added organic esters of acids of hexavalent sulfur, although such esters may be be present in relatively minute quantities as impurities. Typically, hexavalent sulfur compounds as impurities are present in amounts of less than about fifty, preferably less than about ten parts per million by weight based on relatively high equivalent weight active hydrogen component.

Additives such as surface active agents, antistatic agents, plasticizers, fillers, flame retardants, pigments, stabilizers such as antioxidants, fungistatic and bacteriostatic substances and the like are optionally used in polyurea foams produced according to the practice of the invention.

For instance, in producing polyurea foams by the process of the invention, foam stabilizers are optionally used according to procedures known in the art. Suitable foam stabilizers are generally wetting agents or surface active agents. Suitable foam stabilizers include nonionic surfactants, wetting agents, organo-silicon compounds and the like. Exemplary foam stabilizing compounds are disclosed, for instance, in U.S. Pat. Nos. 2,764,565: 3,887,500 and U.S. Pat. No. 3,957,842. Such foam stabilizers, surface active compounds and combinations thereof are generally commercially available with specific instructions as to their use. Additional information on using such additives in polyurea foams is given in U.S. Pat. No. 4,845,133. Cell regulating additives are also suitable for use in the practice of the invention and include paraffins, fatty alcohols, dimethylpolysiloxanes and the like.

In foams produced according to the practice of the invention, use of a cell opener is frequently advantageous. Addition of alkali metal halide salts often produces closed cell foams which may shrink unless cell openers are used. Compounds useful as cell openers and methods of their use is generally known in the art. Exemplary cell openers include fumed silica and certain polyether polyols having relatively high proportion of ethylene oxide units, relatively high functionality and relatively high equivalent weights such as are disclosed in copending U.S. application Ser. No. 186,418 to Nichols et al., filed Apr., 26, 1988, and now U.S. Pat. No. 4,863,976, which application is incorporated herein by reference in its entirety. Processes for the use of other cell openers are known to those skilled in the art and available from the suppliers thereof.

Cell openers are generally used in amounts sufficient to produce foams having desirable air flow measurements. Air flow is a measure of the air which will pass through a foam. It is measured according to ASTM D 3574-86 in cubic feet per minute (cfm) (1 cfm is about 0.47193 liters per second (l/sec)). In the case of free rise foams, the air flow measurements are preferably at least about 2, preferably from about 2 to about 7 cubic feet per minute (cfm) (about 0.9 to 3.3 l/sec). Molded foams advantageously have air flows of from about 0.1 cfm to about 7 cfm, preferably from about 1 cfm to about 6 cfm.

Several characteristics of flexible foams indicate aspects of their formation and properties. Cream time, rise time and blow off are routinely measured during foam production. Cream time is classically defined as the time from introduction of polyisocyanate components into active hydrogen components until a foaming mass changes from clear to opaque. Rise time is the time from introduction of polyisocyanate components into active hydrogen components until a foam completes its rising, that is, until the foam reaches its greatest volume.

The following examples are offered only for purposes of illustrating the process of the invention and are not to be viewed as limiting the present invention. All parts and percentages are on a weight basis unless otherwise indicated. Examples of the invention are designated numerically. Comparative samples are not examples of the invention and are designated with alphabetic characters and are indicated by the abbreviation "C.S."

In the examples below, load bearing strength is generally measured as IFD, the force required to compress a foam sample of designated thickness to a given percentage of that thickness, by the procedures of ASTM D 3574-86, except that the sample sizes are as indicated. When the sample is relatively small, the compressive load deflection (CLD) is measured according to ASTM D 3574-86: it differs from the IFD in that pressure is applied over the entire surface of the foam rather than to a limited area thereof. A foam sample for measurement of IFD4 is generally $15 \times 15 \times 4.5$ inches when molded to that size or $13 \times 13 \times 4$ inches when cut from a large slab. In the tables, indentation force deflection is indicated by IFD3 or IFD4, where the 3 and 4 refer to the thickness in inches of the exterior sides of the samples. The forces required for compression to 25% and 65% of the thickness are measured and are referred to as the 25% IFD and 65% IFD, respectively. IFD is reported as pounds per 50 square inches which is equivalent to Newtons per 323 square centimeters.

Compression set refers to a measurement of the percentage of height regained after compression to one level, for instance 50% of the thickness, for a period of about 22 hours as described in ASTM D-3574-86. A sample $2 \times 2'1$ inches generally cut from the center of a sample is used for density measurement except where otherwise indicated.

EXAMPLES 1-2 AND COMPARATIVE SAMPLES A-B : USE OF LITHIUM CHLORIDE IN A MOLDED POLYUREA FOAM

Each foam represented in Table I is prepared on using a hand mixing procedure to produce $8 \times 8 \times 3$ inch pads of foam. A mixture of 100 parts by weight of an ortho-phenyl amine capped triol (prepared by reacting the ethylene oxide capped propylene oxide polyether nominal triol, having a molecular weight of about 4800 with p-nitrochlorobenzene and reducing the nitro groups to primary amine groups) is mixed with 3.8 parts of water (containing the amounts of lithium chloride indicated in Table I), 1.7 parts of diethanolamine, 1.6 parts of a polyalkyleneoxymethyl silicone surfactant commercially available from Dow Corning Corporation under the trade designation DC 5043, 0.005 parts of a silicone oil cell size control additive commercially available from Dow Corning Corporation under the trade designation DCF1-1630, 0.25 parts of 33 weight percent triethylene diamine in a dipropylene glycol solution, and 0 005 parts by weight of gellation catalyst containing dibutyltin dithiolaurate, commercially available from Witco Chemical Co. under the trade designation FOMREZ ® UL-1 is mechanically stirred for 30 seconds Then, 48.4 parts of toluene diisocyanate is added and stirred 3 seconds to form a mixture. The mixture is quickly poured into an aluminum mold preheated to about 60° C. The mixture foams in the mold for 2 minutes without additional heating, then the mold is heated for 4 minutes in a 121° C. oven. Upon removal from the mold, the pads are thoroughly mechanically crushed to open the cells.

Air flow, IFD3, tear resistance, resiliency and percent hysteresis are measured according to the procedures of ASTM 3574-86. The burn rate is determined by the Motor Vehicle Safety Standard MVSS-302, Seven Day Burn Performance Test The results of the burn test are not intended to reflect the performance of these or any other materials under actual fire conditions The results of these measurements are shown in Table I.

TABLE I

| Sample No. | A | B | 1 | 2 |
| --- | --- | --- | --- | --- |
| Parts LiCl* | 0.0 | 0.1 | 0.25 | 0.5 |
| Density, pcf | 1.98 | 1.94 | 2.05 | 2.04 |
| Tensile Strength, psi | 15.0 | 17.0 | 18.1 | 16.8 |
| Elongation, % | 109 | 104 | 108 | 102 |
| Resiliency, % | 50 | 45 | 45 | 46 |
| CLD 25% | 28 | 28 | 33 | 34 |
| CLD 65% | 66 | 64 | 71 | 86 |
| % Hystersis | 72 | 72 | 72 | 67 |
| Air Flow, cfm | 1.99 | 0.74 | 0.55 | 1.44 |
| Burn rate, in/min | 3.5 | — | — | 0.0 |

*Amount of LiCl is reported as parts by weight of anhydrous LiCl per hundred parts of polyol.
Not an example of the invention.

The data in Table I shows that among foams of similar formulation and density, CLD 25% and CLD 65% both increase with addition of from 0.25 to 0.5 parts by weight lithium chloride based on 100 parts by weight amine-terminated polyether.

EXAMPLES 3-5 AND COMPARATIVE SAMPLES C and D: USE OF LITHIUM CHLORIDE IN A MOLDED FOAM The procedure of Example 1 is repeated except that the amine capped polyether is a poly(propylene oxide) nominal triol capped with 14% by weight ethylene oxide, having a molecular weight of about 4800 and amine-capped as in Example 1: and 0.15 parts of pentamethyl dipropylene triamine commercially available from Air Products Corp under the trade designation Polycat®77 is used as additional amine catalyst in Examples 3-5 and Comparative Sample C, while in Comparative Sample D the base polyol of Example 3 is used instead of the amine-capped derivative thereof polyol.

Physical properties are measured as in Example 1, except that compression set and modulus are also measured according to the procedures of ASTM 3574-86 The results are shown in Table 11.

TABLE II

| Sample No. | 3 | 4 | 5 | C | D |
|---|---|---|---|---|---|
| LiCl* | 0.25 | 0.5 | 0.1 | 0 | 0 |
| Density, pcf | 2.05 | 2.04 | 1.94 | 1.88 | 2.07 |
| Tensile, psi | 18.1 | 16.8 | 17.0 | 18.4 | 16.9 |
| Elongation, % | 108 | 102 | 104 | 126 | 133 |
| Resiliency, % dropped ball | 45 | 46 | 45 | 44 | 49 |
| Comp. Set 50 Cd % | 30.9 | 40.0 | 29.2 | 36.1 | 15.7 |
| CLD (25%) | 33 | 34 | 28 | 26 | 24 |
| CLD (65%) | 71 | 86 | 64 | 61 | 53 |
| Return to 25% | 23 | 23 | 20 | 18 | 19 |
| % Hysteresis | 72 | 67 | 72 | 68 | 81 |
| Modulus | 2.19 | 2.52 | 2.33 | 2.36 | 2.22 |
| Burn rate, in/min | — | 0.0 | — | 3.5 | 3.5 |
| Air Flow, ft³/min | 0.55 | 1.44 | 0.74 | 1.51 | 1.4 |

(cfm)

*Amount of LiCl is reported as parts by weight of anhydrous LiCl per hundred parts of polyol.
Not an example of the invention.

The data in Table II shows addition of increasing amounts of lithium chloride from about 0.1 to about 0.5 parts by weight per hundred parts of active hydrogen compounds increases the 65% CLD without changing other physical properties outside acceptable limits. Some hinderance of compression set is noted among samples of similar compositions.

EXAMPLES 6-12 AND COMPARATIVE SAMPLES E AND F: USE OF VARIOUS ALKALI METAL HALIDES IN POLYUREA FOAMS

The procedure of Example 1 is repeated except that, in Example 12 half of the amine-capped polyol of Example 1 (Polyol-Amine A) is replaced by an ethylene oxide capped poly (propylene oxide) polyether nominal triol having a molecular weight of about 4800 (Polyol B): 4 parts of water are used in Example 10; 1 part of DC 5043 and no DCF1-1630 (as previously identified) are used: the amine catalyst is a 33 weight percent solution of triethylene diamine in dipropylene glycol, commercially available from Air Products Corp. under the trade designation Dabco® 33 LV: and 0.15 parts of pentamethyl dipropylene triamine, commercially available from Air Products Corp. under the trade designation Polycat® 77 is used with the indicated amounts of alkali metal halide salts listed in Table IV in place of the lithium chloride of Example 1. A mold temperature of 155° F. is used.

Physical properties are measured as in Example 1, except that compression set and modulus are also measured according to the procedures of ASTM 3574-86. G factor is guide factor, which is a density normalized ILD. The rise time is the time from pouring the mixture into the mold until foaming of material out of mold holes. The results are shown in Table III.

TABLE III

| Sample No. | E* | F* | 6 | 7 | 8 | 9 | 10 | 11 | 12 |
|---|---|---|---|---|---|---|---|---|---|
| Isocyanate TDI | 48.6 | 48.6 | 48.6 | 48.6 | 48.6 | 48.6 | 48.6 | 48.6 | 48.6 |
| Polyol-Amine A | — | — | — | — | — | — | — | — | 50 |
| Polyol B | 100 | 100 | 100 | 100 | 100 | 100 | 100 | 100 | 50 |
| Crosslinker DEOA | 1.7 | 1.7 | 1.7 | 1.7 | 1.7 | 1.7 | 1.7 | 1.7 | 1.7 |
| Water | 3.8 | 3.8 | 3.8 | 3.8 | 3.8 | 3.8 | 4.0 | 3.8 | 3.8 |
| Salt type | None | CsCl | LiCl | KI | LiCl | KSCN | LiCl | KI | LiCl |
| Salt amount | None | 0.25 | 0.25 | 0.25 | 0.5 | 0.25 | 0.25 | 0.50 | 0.50 |
| Silicone DC 5043 | 1.0 | 1.0 | 1.0 | 1.0 | 1.0 | 1.0 | 1.0 | 1.0 | 1.0 |
| amine catalyst | 0.30 | 0.20 | 0.20 | 0.25 | 0.20 | 0.25 | 0.20 | 0.25 | 0.20 |
| Tin Catalyst | 0.005 | 0.005 | 0.005 | 0.005 | 0.005 | 0.005 | — | — | 0.005 |
| Polycat ®77 | 0.15 | 0.10 | 0.15 | 0.05 | 0.15 | 0.10 | 0.15 | 0.05 | 0.15 |
| Mold Temp., °F. | 155 | 155 | 155 | 155 | 155 | 155 | 155 | 155 | 155 |
| Rise Time, sec. | 47 | 40 | 50 | 49 | 87 | 34 | 44 | 54 | 67 |
| Density, pcf | 1.87 | 2.00 | 1.95 | 2.03 | 1.96 | 1.94 | 1.84 | 1.98 | 1.77 |
| Tensile, psi | 19.1 | 20.7 | 10.7 | 18.6 | 17.3 | 20.0 | 16.8 | 21.3 | 20.7 |
| Elongation % | 160 | 155 | 179 | 145 | 152 | 186 | 154 | 164 | 134 |
| Tear Resistance, lbs./in. | 1.63 | 1.41 | 1.50 | 1.51 | 1.46 | 1.45 | 1.41 | 1.43 | 1.51 |
| Resiliency | 43 | 43 | 41 | 42 | 41 | 42 | 41 | 43 | 42 |
| Comp. Set 50 Cd % | 65.0 | 72.0 | 73.0 | 76.0 | 69.1 | 81.0 | 80.0 | 79.0 | 65.0 |
| CLD (25%) | 21 | 20 | 27 | 31 | 32 | 25 | 25 | 29 | 33 |
| CLD (65%) | 59 | 51 | 64 | 73 | 76 | 61 | 59 | 71 | 82 |
| Return to 25% | 15 | 15 | 18 | 21 | 21 | 17 | 17 | 20 | 21 |
| % Hysteresis | 70 | 72 | 67 | 68 | 64 | 69 | 66 | 67 | 64 |
| Modulus | 2.76 | 2.53 | 2.38 | 2.36 | 2.36 | 2.43 | 2.33 | 2.46 | 2.5 |
| 25% G-Factor | — | — | — | — | — | 12.89 | 13.58 | 14.65 | 18.64 |
| Burn rate, in/min | 3.5 | — | — | — | 0.0 | — | — | — | 0.0 |
| Air Flow, cfm | 1.6 | 1.4 | 1.3 | 1.8 | 1.2 | 1.2 | 1.7 | 1.2 | 1.1 |

*Not an example of this invention.

The data in Table III show that various alkali metal halide salts are also useful in preparing polyurea foams having increased load bearing strengths.

EXAMPLES 13-14 AND COMPARATIVE SAMPLE G: PREPARATION OF POLYUREA FOAMS CONTAINING LITHIUM CHLORIDE USING A FOAM DISPENSING MACHINE

The foams of Examples 13-14 are prepared using an Admiral low pressure foam machine. A "B-side" masterbatch stream is prepared from relatively high equivalent weight compounds as indicated in Table IV and 1.5 parts of DEOA, 3.8 parts water, 0.12 parts Dabco ®️ 33-LV, 0.24 parts Polycat ®️ 77 (all as identified in Examples 1, 3 and 6), 0.075 parts NIAX ®️ A-1 [70 weight percent bis(dimethylaminoethyl ether) and 30 weight percent dipropylene glycol] commercially available from Union Carbide Corp. The amounts of lithium chloride and the silicone compounds are indicated in Table IV. The compounds are added sequentially and blended with sufficient stirring to mix them thoroughly. The masterbatch and a toluene diisocyanate stream are dispensed at a rate of about 75 pounds per minute in a relative proportion to achieve an isocyanate index of 105.

A mold is preheated to about 60° C. Each foam is injected into a 15×15×4.5 inch mold for a shot time of about 1.5 seconds. Each foam is allowed to stand for about two minutes at ambient temperatures followed by 4 minutes in a 250° F. oven. Each foam sample is demolded and thoroughly mechanically crushed. After crushing, the foam is allowed to cool to ambient temperatures. Physical properties are measured as in Example 1 and reported in Table IV.

TABLE IV

| Sample No. | G* | 13 | 14 |
|---|---|---|---|
| Isocyanate index | 105 | 105 | 105 |
| amine-capped polyol, pphp | 100 | 100 | 100 |
| Crosslinker DEOA | 1.5 | 1.5 | 1.5 |
| Water | 3.8 | 3.8 | 3.8 |
| Salt type | — | LiCl | LiCl |
| Salt amount | 0 | 0.25 | 0.5 |
| Silicone DC 1630 | 0.05 | 0.05 | 0.05 |
| DABCO ®️ 33 LV | 0.12 | 0.12 | 0.12 |
| NIAX A-1 | 0.075 | 0.075 | 0.075 |
| Polycat ®️ -77 | 0.24 | 0.24 | 0.24 |
| Rise Time, sec. | 43 | 38 | 38 |
| Density, pcf | 2.0 | 2.0 | 2.0 |
| Tensile psi | 12 | 18 | 18 |
| Elongation % | 115 | 146 | 139 |
| Tear Resistance, lbs./in. | 1.2 | 1.5 | 1.3 |
| Resiliency | 52 | 47 | 48 |
| Comp. Set 50 Cd % | 33 | 73 | 65 |
| Humid aged Comp. Set 50 Cd % | 76 | 84 | 83 |
| IFD (25%) | 31 | 32 | 34 |
| IFD (65%) | 77 | 87 | 92 |
| Return to 25% | 22 | 21 | 23 |
| % Hysteresis | 71 | 66 | 68 |
| Modulus | 2.5 | 2.7 | 2.7 |
| Air Flow, cfm | 6.4 | 3.8 | 2.0 |

*Not an example of this invention.

The data in Table IV show that flexible polyurea foams containing lithium chloride and prepared on a foam dispensing machine also show an increase in IFD with increasing amount of lithium chloride.

EXAMPLES 15–16 AND COMPARATIVE SAMPLE H: POLYUREA FOAMS PREPARED FROM SECONDARY AMINE-TERMINATED COMPOUNDS USING A FOAM DISPENSING MACHINE

The procedure of Example 13 is repeated except that the amine-terminated compound of Example 13 is replaced by a secondary amine-terminated polyether prepared by reacting a nominally trifunctional, aliphatic primary amine-terminated poly(propylene oxide) of about 5000 molecular weight, commercially available from Texaco Chemical Co. under the trade designation Jeffamine ®️ T-5000 with acrylonitrile until essentially all primary amine groups are converted to secondary amine groups. To form the secondary amine, about 4600 g of the amine-terminated poly(propylene oxide) is mixed with about 1120 g methanol and sparged with nitrogen. About 1600 g of acrylonitrile is added slowly to the vigorously agitated mixture. No temperature rise is observed. When addition of acrylonitrile is complete, the temperature is raised from ambient to 40° C. and held there for about 12 hours. Vacuum and heat of about 100° C. are used to remove methanol and residual acrylonitrile until neither shows in a gas chromatograph.

Additional catalysts and surfactants are also used as indicated in Table V. Dabco ®️ XDM is commercially available from Air Products Corp. DCF1-1630 is a polyalkyleneoxymethyl silicone surfactant commercially available from Dow Corning Corp. Silicone Y-10184 is a silicone surfactant commercially available from Union Carbide.

Physical properties are measured as in Example 1 and reported in Table V.

TABLE V

| Sample No. | H* | 15 | 16 |
|---|---|---|---|
| Isocyanate index | 105 | 105 | 105 |
| amine-capped polyether | 100 | 100 | 100 |
| Crosslinker DEOA | 1.5 | 1.7 | 1.7 |
| Water | 3.8 | 3.8 | 3.8 |
| Salt type | — | LiCl | LiCl |
| Salt amount | 0 | 0.5 | 1.0 |
| Silicone Y-10184 | 1.3 | 0.25 | 0.5 |
| Silicone DCF1-1630 | — | 0.05 | 0.05 |
| DABCO ®️ 33 LV | 0.24 | 0.24 | 0.24 |
| Fomrez ®️ UL-1 | 0.004 | 0.004 | 0.004 |
| DABCO ®️ XDM | — | — | 0.5 |
| NIAX A-1 | 0.075 | 0.075 | 0.075 |
| Polycat ®️ -77 | 0.24 | 0.24 | 0.24 |
| Rise Time, sec. | 34 | 67 | 65 |
| Density, pcf | 2.0 | 2.0 | 2.0 |
| Tensile psi | 21 | 17 | 19 |
| Elongation % | 172 | 142 | 138 |
| Tear Resistance, lbs./in. | 1.3 | 1.2 | 1.3 |
| Resiliency | 51 | 58 | 50 |
| Comp. Set 50 Cd % | 15 | 22 | 19 |
| Humid aged Comp. Set 50 Cd % | 48 | 75 | 74 |
| IFD (25%) | 18 | 22 | 37 |
| IFD (65%) | 58 | 64 | 89 |
| Return to 25% | 14 | 17 | 25 |
| % Hysteresis | 78 | 77 | 68 |
| Modulus | 3.2 | 2.9 | 2.4 |
| Air Flow, cfm | 3.5 | 5.3 | 3.6 |

*Not an example of this invention.

The data in Table V show that when a secondary amine-terminated compound is used in a foam dispensing machine, increased load bearing strength is also obtained with use of an alkali metal salt.

We claim:

1. An improvement in a process for preparing a flexible, water-blown polyurea foam by reacting a reaction mixture containing at least one polyisocyanate component and an active hydrogen component, wherein active hydrogen compounds of relatively high equivalent weight have an average of about 1.5 to about 4 active hydrogen-containing groups per molecule, of which active hydrogen-containing groups: an average of (a) from about 5 to about 60 percent are primary aliphatic amine groups or (b) at least about 25 percent are primary aromatic, secondary aliphatic, Lewis acid-blocked primary or secondary aliphatic or aromatic amine groups or mixtures of such groups, the improvement comprising incorporating into the reaction mixture an amount of at least one alkali metal halide salt effective to measurably increase load bearing strength of the foam over that of a foam having the same components but without the alkali metal halide salt.

2. A flexible, water-blown polyurea foam formed from reaction of a reaction mixture containing at least one polyisocyanate component; an active hydrogen component, wherein active hydrogen compounds of relatively high equivalent weight have an average of about 1.5 to about 4 active hydrogen-containing groups per molecule of which active hydrogen-containing groups: an average of (a) from about 5 to about 60 percent are primary aliphatic amine groups or (b) at least about 25 percent are primary aromtic, secondary aliphatic, Lewis acid-blocked primary or secondary aliphatic or aromatic amine groups or mixtures of such groups: and an amount of at least one alkali metal halide salt effective to increase load bearing strength of the foam over that of a foam having the same components but without the alkali metal halide salt.

3. The foam of claim 2 wherein the reaction mixture additionally contains a chain extender, crosslinker or mixture thereof.

4. The foam of claim 3 wherein the alkali metal halide salt is soluble in the active hydrogen component, the chain extender, the crosslinker or water.

5. The foam of claim 2 wherein the alkali metal halide salt is selected from the group consisting of alkali metal chlorides and iodides.

6. The foam of claim 5 wherein the alkali metal halide salt is selected from the group consisting of lithium chloride, potassium iodide and mixtures thereof.

7. The foam of claim 2 wherein the alkali metal halide salt is present in an amount of from about 0.1 to about 50 millimoles of salt per 100 grams of active hydrogen component.

8. The foam of claim 7 wherein the alkali metal halide salt is present in an amount of from about 1 to about 40 millimoles of salt per 100 grams of active hydrogen component.

9. A flexible, water-blown polyurea foam formed from a reaction mixture containing at least one polyisocyanate component and an active hydrogen component, wherein active hydrogen compounds of relatively high equivalent weight have an average of about 1.5 to about 4 active hydrogen-containing groups per molecule, of which active hydrogen-containing groups: an average of (a) from about 5 to about 60 percent are primary aliphatic amine groups or (b) at least about 25 percent are primary aromatic, secondary aliphatic, Lewis acid-blocked primary or secondary aliphatic or aromatic amine groups or mixtures of such groups, said foam having multiple areas of differing load bearing strength corresponding to areas having differing relative proportions of at least one alkali metal halide salt.

10. The foam of claim 9 wherein the alkali metal halide salt is selected from the group consisting of alkali metal chlorides and iodides.

11. The foam of claim 10 wherein the alkali metal halide salt is selected from the group consisting of lithium chloride, potassium iodide and mixtures thereof.

12. The foam of claim 9 wherein the alkali metal halide salt is present in an amount of from about 0.001 to about 100 millimoles of salt per 100 grams of active hydrogen component in at least one area of the foam.

13. The foam of claim 12 wherein the alkali metal halide salt is present in an amount of from about 1 to about 40 millimoles of salt per 100 grams of active hydrogen component in at least one area of the foam.

14. A method for preparing a flexible, water-blown polyurea foam by reacting a reaction mixture containing at least one polyisocyanate component and an active hydrogen component, wherein active hydrogen compounds of relatively high equivalent weight have an average of about 1.5 to about 4 active hydrogen-containing groups per molecule, of which active hydrogen-containing groups: an average of (a) from about 5 to about 60 percent are primary aliphatic amine groups or (b) at least about 25 percent are primary aromatic, secondary aliphatic, Lewis acid-blocked primary or secondary aliphatic or aromatic amine groups or mixtures of such groups, said foam having areas of differing load bearing strength, by incorporating therein differing concentrations of at least one alkali metal halide salt in each of the areas.

15. The method of claim 14 wherein the reaction mixture additionally contains a chain extender, crosslinker or mixture thereof.

16. The method of claim 15 wherein the alkali metal halide salt is incorporated as a solution in the crosslinker or chain extender.

17. The method of claim 14 wherein the alkali metal halide salt is selected from the group consisting of alkali metal chlorides and iodides.

18. The method of claim 17 wherein the alkali metal halide salt is selected from the group consisting of lithium chloride, potassium iodide and mixtures thereof.

19. The method of claim 14 wherein the alkali metal halide salt is present in an amount of from about 0.001 to about 100 millimoles of salt per 100 grams of active hydrogen component in at least one area of the foam.

20. The method of claim 19 wherein the alkali metal halide salt is present in an amount of from about 1 to about 40 millimoles of salt per 100 grams of active hydrogen component in at least one area of the foam.

21. An active hydrogen composition comprising (a) at least one active hydrogen compound wherein active hydrogen compounds of relatively high equivalent weight have an average of from about 1.5 to about 4 active hydrogen-containing groups per molecule, of which active hydrogen-containing groups: an average of (1) from about 5 to about 60 percent are primary aliphatic amine groups or (2) at least about 25 percent are primary aromatic, secondary aliphatic, Lewis acid-blocked primary or secondary aliphatic or aromatic amine groups or mixtures of such groups; (b) from about 2 to about 12 parts by weight of water per 100 parts by weight component (a); and (c) an alkali metal halide salt in an amount sufficient to increase the load bearing strength of a foam made by reacting the active hydrogen composition with a polyisocyanate over the load bearing strength of a foam having the same components but without the alkali metal halide salt.

22. The composition of claim 21 wherein the reaction mixture additionally contains a chain extender, crosslinker or mixture thereof.

23. The composition of claim 21 wherein the alkali metal halide salt is selected from the group consisting of alkali metal chlorides and iodides.

24. The composition of claim 23 wherein the alkali metal halide salt is selected from the group consisting of lithium chloride, potassium iodide and mixtures thereof.

25. The composition of claim 21 wherein the alkali metal halide salt is present in an amount of from about 0.001 to about 100 millimoles of salt per 100 grams of active hydrogen component.

26. The composition of claim 25 wherein the alkali metal halide salt is present in an amount of from about 1 to about 40 millimoles of salt per 100 grams of active hydrogen component.

27. The composition of claim 21 wherein, of the active hydrogen-containing groups, from about 5 to about 60 percent are primary aliphatic amine groups.

28. The composition of claim 21 wherein, of the active hydrogen-containing groups, at least about 25 percent are primary aromatic amine groups.

29. The composition of claim 21 wherein, of the active hydrogen-containing groups, at least about 25 percent are Lewis acid blocked primary or secondary aliphatic or aromatic amine groups or mixtures of such groups.

* * * * *